United States Patent Office 3,847,846
Patented Nov. 12, 1974

3,847,846
COMPOSITION FOR PREPARING ELECTRO-
CONDUCTIVE RESINS
Kiyohiko Asada, Hiratsuka, Japan, assignor to
Kansai Paint Co., Ltd.
No Drawing. Filed June 13, 1972, Ser. No. 262,293
Claims priority, application Japan, July 1, 1971,
46/47,692
Int. Cl. C08f 3/50
U.S. Cl. 260—13
13 Claims

ABSTRACT OF THE DISCLOSURE

A composition for preparing electroconductive resins with excellent properties, which comprises:

(A) one or more members being selected from the group consisting of:
 (I) alkylene sulfonic esters or alkylene sulfonate esters of acrylic acid or methacrylic acid;
 (II) alkylene phosphoric esters or alkylene phosphate esters of acrylic acid or methacrylic acid; and
 (III) alkylene phosphoric diesters or alkylene phosphate diesters of acrylic acid or methacrylic acid; and
(B) the compounds which contain epoxy groups in the molecules; and if necessary,
(C) solvents, polymerization initiators and/or photosensitizers.

This invention relates to composition for preparing electroconductive resins.

Further the invention relates to the composition for preparing the electroconductive resins which have excellent properties such as electroconductivity, mechanical properties, solvent resistance, film forming property, adhesiveness, transparency and wear resistance.

In the ordinary art, the resins which are added with dispersion of electroconductive materials, for example, metallic compounds or polycyclic aromatic compounds; or the aqueous solutions of the resins containing polyvinyl benzyl quaternary ammonium salt, oligostyrene sulfonic acid or polyvinyl pyridine quaternary compound as their principal components, are well known as composition for preparing the electroconductive resins. However, the electroconductive films obtained from the former resins are inferior in the transparency and mechanical properties, while in the latter solutions of the resins, the synthetic reactions to obtain such resins are difficult to be carried out, and the electroconductivities of the films obtained from such resins are low, and in addition to that the electroconductivities thereof decrease with the lowering of the relative humidity. Further, the films are formed by the evaporation of solvents as used, therefore the solvent resistance, mechanical properties, adhesiveness and wear resistance of such films are inferior.

Accordingly, the object of the present invention is to overcome the above-mentioned defects in the ordinary compositions for preparing the electroconductive film.

Pursuant to the above object, the present invention provides a novel composition for preparing the electroconductive resin which comprises:

(A) One or more members selected from the group consisting of:
(I) a compound represented by the following general formula, hereinafter referred to as "sulfonic ester":

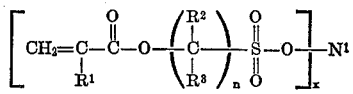

in which $R^1$ is a hydrogen atom or a methyl group; each of $R^2$ and $R^3$ is a hydrogen or halogen atom; $n$ is an integer from 1 to 5; $x$ is an integer from 1 to 3; and $M^1$ is a hydrogen atom, Na, Li, K, Ag, Cu, Mg, Ca, Zn, Ba, Al ammonium or amine, (II) a compound represented by the following general formula, hereinafter referred to as "phosphoric ester":

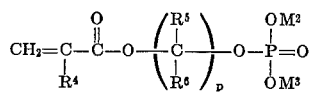

in which $R^4$ is a hydrogen atom or a methyl group each of $R^5$ and $R^6$ is a hydrogen or halogen atom; $p$ is an integer from 1 to 4; and each of $M^2$ and $M^3$ is a hydrogen atom, Na, Li, K, Ag, ammonium or amine, and (III) a compound represented by the following general formula, hereinafter referred to as "phosphoric diester":

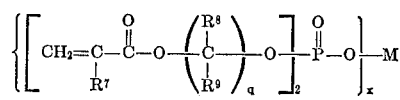

in which $R^7$ is a hydrogen atom or a methyl group; each of $R^8$ and $R^9$ is a hydrogen or halogen atom; $q$ is an integer from 1 to 4; $x$ is an integer from 1 to 3; and $M^4$ is a hydrogen atom, Na, Li, K, Ag, Cu, Mg, Ca, Zn, Ba, Al, ammonium or amine and (B) A compound containing an epoxy group in the molecule, hereinafter referred to as "epoxy compound," as the principal components, and if necessary, (C) A solvent, polymerization initiator and/or photosensitizer.

The above-mentioned sulfonic esters as used in the present invention are alkylene sulfonic esters or alkylene sulfonate esters of acrylic acid or methacrylic acid. As for the alkylene sulfonic esters of acrylic acid or methacrylic acid, for example, sulfomethylene acrylate, sulfoethylene acrylate, sulfoethylene methacrylate, sulfotrimethylene acrylate, sulfoisopropylene acrylate, sulfotrimethylene methacrylate, sulfotetramethylene acrylate, sulfotetramethylene methacrylate and sulfopentamethylene acrylate may be used. And in case the integer $n$ in the foregoing general formula becomes more than 5, the reactivity of the ethylenically unsaturated group of the sulfonic ester is decreased, and the cross-linking property of the composition is almost lost. The aforesaid alkylene sulfonate esters can be obtained by neutralizing the corresponding alkylene sulfonic esters with bases or metal chlorides. The bases or the chlorides which can be used for the neutralization may be, for example, sodium hydroxide, lithium hydroxide, potassium hydroxide and silver perchloride as monovalent metallic bases or the chloride; copper hydroxide, magnesium chloride, calcium chloride, barium chloride and zinc chloride as divalent metallic bases or the chlorides; and aluminum hydroxide as a trivalent metallic base. Further, there are many other bases which can be used for the neutralization such as ammonia, aliphatic amines and cyclic amines, for example, monomethylamine, dimethylamine, trimethylamine, monoethylamine, diethylamine, triethylamine, n-butylamine, monoethanolamine, diethanolamine and triethanolamine as aliphatic monoamines; ethylenediamine as an aliphatic diamine; pyridine, morpholine and piperidine as cyclic monoamines; and p-phenylenediamine as a cyclic diamine. The neutralization can be carried out in accordance with the well known method.

The phosphoric esters which are used in the present invention are alkylene phosphoric esters or alkylene phosphate esters of acrylic acid or methacrylic acid. As for the alkylene phosphoric esters of acrylic acid or methacrylic acid, for example, phosphoric ethyleneacrylate, phosphoric ethylenemethacrylate, phosphoric trimethyleneacrylate, phosphoric isopropylenemethacrylate, phosphoric trimethylenemethacrylate, phosphoric tetramethylenemethacrylate and phosphoric 1-chloromethyl-ethylenemethacrylate may be used. In the foregoing general formula, if the integer $p$ becomes more than 4, the reactivity of the ethylenically unsaturated group of the phosphoric ester lowers and the crosslinking property of the composition becomes worse, which is not preferable. Said alkylene phosphate esters can be obtained by neutralizing the above-mentioned alkylene phosphoric esters. The bases or chlorides as used for such neutralization may be those as disclosed in the foregoing explanation of the sulfonic esters. This neutralization may be carried out also according to the ordinarily known method.

The phosphoric diesters which are used in the present invention are alkylene phosphoric diesters or alkylene phosphate diesters of acrylic acid or methacrylic acid. As for the alkylene phosphoric diesters of acrylic acid or methacrylic acid, for example, phosphoric bis(ethyleneacrylate),
phosphoric bis(ethylenemethacrylate),
phosphoric bis(trimethyleneacrylate),
phosphoric bis(isopropylenemethacrylate),
phosphoric bis(trimethylenemethacrylate),
phosphoric bis(tetramethyleneacrylate) and
phosphoric bis(tetramethylenemethacrylate)

may be used. In the foregoing general formula, if the integer $q$ becomes more than 4, the reactivity of the ethylenically unsaturated group of the phosphoric diester lowers and the cross-linking property thereof becomes worse, which is not preferable for the object of the invention. Further, said alkylene phosphate diesters can be obtained by neutralizing the above-mentioned alkylene phosphoric diesters. The bases or chlorides as used for such neutralization may be those as disclosed in the foregoing explanation with regard to the sulfonic esters.

The epoxy compounds which are used in the present invention, are miscible with the above sulfonic esters, phosphoric esters and phosphoric diesters, and are the compounds containing epoxy groups in the molecules. Such epoxy compounds having epoxy equivalent of 100 g. to 2000 g./mole of epoxy group are, for example, a polymer (having number average molecular weight of about 2000 to about 5000) of the ester of glycidol and acrylic acid or methacrylic acid; a copolymer (having number average molecular weight of about 2000 to about 5000 and containing above ester of more than 20% by weight) of the above ester with ethyl acrylate, methyl methacrylate, styrene, vinyl chloride or vinyl acetate; a reaction product of epichlorohydrin and bisphenol A; a reaction product (having number average molecular weight of about 10,000 to about 100,000) of cellulose derivative and epichlorohydrin; or a reaction product (having number average molecular weight of about 10,000 to about 100,000) of polyvinyl alcohol and epichlorohydrin.

The composition of the present invention comprises from 25 to 85% by weight of one or more members selected from the group consisting of the above-mentioned sulfonic esters, phosphoric esters and phosphoric diesters, and from 75 to 15% by weight of one or more members of the above-mentioned epoxy compounds, as the principal components. It is not desirable to decrease the content of the epoxy compounds less than 15% by weight, because the film forming property becomes worse, and thereby the excellent mechanical properties, solvent resistance, surface hardening and adhesiveness of the obtained film cannot be expected. Further, it is also not desirable to increase the content of the epoxy compounds more than 75% by weight, because the electroconductivity of the obtained film is decreased. As defined in the above, when the epoxy compounds are solid state at the room temperature and more than 50 to 60% by weight of the epoxy compounds are used for the mixture of the composition, the mixture is liable to become hard to deal with, as the viscosity thereof is increased. Therefore, it is preferable to dilute the mixture of the composition with the solvents such as hydrocarbons, alcohols, ketones or esters. Further, in case that the composition which is diluted with the solvents is cured by ionizing radiation or actinic rays, it is desirable to apply the irradiation after the evaporation of such solvent in the coated film.

The composition of the present invention is cured by two kinds of simultaneous cross linking reactions by heating or irradiation of ionizing radiation or actinic rays, that is, one is the cross linking reaction between the ethylenically unsaturated bonds contained in one or more compounds selected from the group consisting of sulfonic esters, phosphoric esters and phosphoric diesters, and the other is the ionic reaction between the metallic ion M in the above compounds, as specified in the foregoing general formulae, and the epoxy group in the epoxy compound.

The curing by heating of the composition of the present invention may be carried out by applying the composition with the heat at a temperature from the room temperature to 150° C., preferably in the range from 50 to 140° C., for 1 to 60 minutes, in the presence of the ordinarily used polymerization initiators such as benzoyl peroxide, hydrogen peroxide, methy ethyl ketone peroxide, azobisisobutyronitrile, lauroyl peroxide, azobisdimethyl valeronitrile, diisopropyl peroxycarbonate, t-butyl peroxypivalate, acetylcyclohexyl sulfonyl peroxide, 1,1-azo-1-chloro-1-cyanobis (1-phenyl ethane) or di-t-butyl peroxide, or without using such polymerization initiators. In the above-mentioned heat curing, it is not desirable to heat at a temperature above 150° C. because the foaming of the film is caused to occur.

The curing of the composition by the application of actinic rays may be carried out by irradiating the actinic rays with the wave length of about 2500 to about 6000 angstroms in the presence of one or more of the compounds selected from the above-mentioned polymerization initiators, and other ordinary photosensitizers such as $\alpha$-azobis-1-cyclohexane carbonitrile, diphenyl disulfide, tetramethylthiuram monosulfide, tetramethylthiuram disulfide, benzoin, benzoin ethyl ether, anthraquinone, biacetyl, benzophenone, acetophenone, 9-bromoacetophenone, uranyl nitrate, silver perchlorate and ferric chloride.

Further, the composition of the present invention may be cured by the application of ionizing radiations such as electron beam and other radiant rays, in this case, no particular polymerization initiator is necessary, however, the above-mentioned peroxides or azo-compounds may be contained as the polymerization initiators without any substantial trouble.

When the above-mentioned photosensitizers and polymerization initiators are used for the composition of the present invention, the amount thereof may be 10% or less by weight, and preferably 7% or less by weight.

In addition to the above components, the composition of the present invention may be added with surface active agents and metallic salts, in order to improve the electroconductivity of the film obtained. That is, for example, metallic salts, sulfates and phosphates of carboxylic acids as anion surface active agents; amine salts and pyridinium salts as cation surface active agents; and salts of carboxylic acids, sulfuric esters and of phosphoric esters as ampholytic surface active agents may be used. Further, as the metallic salts, zinc chloride, aluminum chloride, antimony chloride, indium chloride, calcium chloride, gold chloride, cobaltous chloride, stannous chloride, stannic chloride, ferrous chloride, ferric chloride, cuprous chloride, cupric chloride, zinc sulfate, aluminum sulfate, copper sulfate, sodium sulfate, iron phosphate, copper phosphate, zinc phosphate, silver phosphate and silver perchlorate, may be used. The amount of these surface active agents and/or metallic salts being added into the composition of the invention may be 20 parts by weight or less against 100 parts by weight of said composition. And if more than 20 parts by weight of the surface active agents and/or metallic salts is used for the composition, the mechanical properties and solvent resistance of the resin obtained become worse which is not desirable.

As disclosed in the above, the composition of the present invention is cured by the cross linking reaction, and the electric resistance of the cured resin of the invention is only $10^3$ to $10^5$ ohms in the surface specific resistance and the volume specific resistance at a relative humidity of 70%, which value is surprisingly only one-hundredth to one-ten thousandth (1/100 to 1/10000) as compared with those of the conventional electroconductive resins. Further, the conventional electrotroconductive resins have the defect that it is subject to the influence of humidity and when the humidity becomes low, the electroconductivity of such resins is decreased. While the resin formed by the composition of the present invention is not influenced by the humidity and has the excellent electroconductivity as disclosed in the above, this excellent property is considered to be the result of the very high density of the intermolecular cross linkage.

The composition of the present invention is cured by cross linking reaction through the application of heat rays, actinic rays or ionizing radiation. Accordingly, as compared with the conventional evaporation drying type ones, the solvent resistance, mechanical properties, etc. of the product of the composition of the invention are remarkably excellent. Further, the synthesis of each component of the composition of the present invention is easy and economical, and in addition to that there is no fear of gelation of the component during the synthesis. Still further, free hydroxyl groups are contained in the molecule of the cured resin, as the epoxy compounds participate the cross linking reaction of the composition, therefore the adhesiveness to the substrate can be very much improved, and the cross linking reaction in the portion being contacted with oxygen in the air is not inhibited, as the result, an excellent composition with good friction resistance and without surface tackiness can be obtained. Accordingly, the composition of the present invention is quite different from the conventional ones in the structures, and the effects obtained from the composition of the invention are beyond the ordinary conception. The composition of the present invention can be used for various purposes, especially for facsimiles, microfilms, magnetic recording tapes, video recording tapes and electroconductive papers.

The following Examples show various aspects of the invention in greater detail. It should be understood, however, that these are only illustrative. Other combinations and variations from the embodiments shown will no doubt occur to those skilled in the art. These are considered to be part of the invention.

EXAMPLES 1 TO 38, AND COMPARATIVE EXAMPLES 1 TO 4

Each component as indicated in the following Tables was weighed and mixed together with other components to form each composition. The method for curing for each composition was as follows:

A Petri dish (10 cm. in diameter and 1.5 cm. in depth) was fed with mercury to form a mercury layer. One of the compositions of the Examples was poured on said mercury layer so as to form a cured film of 100 microns in thickness, then the cover was fixed for one hour in order to remove the foam contained. Thereafter, the cover was taken off, and if a solvent was used for the composition, the dish was allowed to stand still at the room temperature for removing such solvent. Thus obtained sample was cured under the conditions as indicated in the Table with using light rays, ionizing radiation or heating to form a cured electroconductive film. Then the electroconductivity and the tensile strength of the obtained film were measured.

Meanwhile, each composition of the Examples was applied to Lumilar–T–100 (trade name of polyethylene terephthalate film made by Toray Industries Inc., Japan) so as to form a cured film of 100 microns in thickness. And it was cured under the conditions as indicated in the Table with using light rays, ionizing radiation or heating. Then the obtained cured film was used for testing the water resistance, solvent resistance and pencil hardness.

It will be understood in accordance with the results as shown in the following Tables that the cured films obtained from the compositions of the present invention are excellent in the electroconductivity, water resistance, solvent resistance, mechanical property (tensile strength) and surface hardness (pencil hardness), as compared with those of the ordinarily known ones. Further, the surprising fact is that the transparency, an adhesiveness, shock resistance and film forming property of the film obtained from the composition of the present invention are also remarkable.

TABLE 1a

| Ex. | Sulfonic ester | Phosphoric ester | Phosphoric diester | Epoxy compound | Solvent | Polymerization initiator or photosensitizer | Other additive |
|---|---|---|---|---|---|---|---|
| 1 | SEM (*7) [2.5] | | | Epikote 1004 (*39) [7.5] | Methyl ethyl ketone [20]. | | |
| 2 | SEA (*8) [5.0] | | | GE–2080 (*40) [5.0] | Acetone [20]. | | |
| 3 | SBA (*9) [8.5] | | | GE–5050 (*41) [1.5] | | AIBN (*51) [0.7] | |
| 4 | SEM-Cl (*10) [2.5] | | | PVA-Ep (*42) [7.5] | Acetone [20] | BPO (*52) [0.5] | |
| 5 | SEM [2.5] | | | EtCel-Ep (*43) [7.5] | Acetone [20] | DBPO (*53) [0.1] | Neogen-R (*60) [3.0]. |
| 6 | | Phosmer-M (*18) [2.5] | | GE–8020 (*44) [7.5] | Benzene [10] acetone [10]. | LPO (*54) [0.3] | |
| 7 | | Phosmer-MA (*19) [5.0] | | GMA-H (*45) [5.0] | Ethyl acetate [10] acetone [10]. | ABVN (*55) [0.6] | Teepol B81 (*61) [2.5]. |
| — | | | Phosmer-Cl (*20) [8.5] | GM-8020 [1.5] | | | |

See notes at end of Table 6b.

TABLE 1b

| | Curing condition | | Measuring condition | | Electroconductivity (*2) | | | | | |
|---|---|---|---|---|---|---|---|---|---|---|
| | Temperature (°C.) | Time (min.) | Moisture (percent) | Temperature (°C.) | Surface specific resistance (ohm) | Volume specific resistance (ohm·cm.) | Water resistance(*3) | Solvent resistance (*4) | Tensile strength (kg.) (*5) | Pencil hardness(*6) |
| Example: | | | | | | | | | | |
| 1 | 100 | 10 | 40 | 20 | $8.5 \times 10^5$ | $7.1 \times 10^5$ | 50 | 10 | 1.8 | HB |
| 2 | 100 | 10 | 40 | 20 | $1.0 \times 10^5$ | $9.8 \times 10^4$ | 50 | 10 | 1.6 | B |
| 3 | 100 | 3 | 40 | 20 | $2.1 \times 10^4$ | $1.9 \times 10^4$ | 25 | 5 | 1.4 | 3B |
| 4 | 100 | 3 | 40 | 20 | $3.4 \times 10^5$ | $2.6 \times 10^5$ | 10 | 5 | 1.0 | 3B |
| 5 | 100 | 3 | 40 | 20 | $4.6 \times 10^5$ | $3.9 \times 10^5$ | 20 | 10 | 2.0 | 3B |
| 6 | 80 | 5 | 40 | 20 | $9.8 \times 10^5$ | $3.1 \times 10^5$ | 50 | 10 | 2.5 | B |
| 7 | 50 | 15 | 40 | 20 | $7.6 \times 10^4$ | $4.4 \times 10^4$ | 50 | 10 | 3.0 | B |
| 8 | 140 | 3 | 40 | 20 | $1.2 \times 10^4$ | $3.5 \times 10^4$ | 25 | 10 | 1.7 | 2B |

See notes at end of Table 6b.

TABLE 2a

| | Composition | | | | | | |
|---|---|---|---|---|---|---|---|
| Ex. | Sulfonic ester | Phosphoric ester | Phosphoric diester | Epoxy compound | Solvent | Polymerization initiator or photosensitizer | Other additive |
| 9 | | | Phosmer-MD (*29) [4.5] | GB-1090 (*46) [5.5] | Acetone [20] | BPP (*56) [0.2] | |
| 10 | | | Phosmer-ClD (*30) [5.6] | CAP-Ep (*47) [4.4] | | ACSP (*57) [0.4] | Nickel powder [2.0] |
| 11 | SEM [2.5] | Phosmer-M [2.5] | | CelAc-Ep (*48) [5.0] | Acetone [20] | AIBN [0.6] | Copper powder [3.0] |
| 12 | SEM [2.0] | | Phosmer-ClD [5.0] | Epikote 1004 (3.0) | | | Copper powder [1.0] |
| 13 | | Phosmer-M [4.0] | Phosmer-MD [4.5] | CelAc-Ep [1.5] | | BPO [0.1] | |
| 14 | SEM [1.0] | Phosmer-Cl [1.0] | Phosmer-MD [2.0] | CAP-Ep [6.0] | Methyl-ethyl ketone [20] | BPO [0.1] | |
| 15 | SEN-Na (*11) [2.5] | | | CAP-Ep [7.5] | do | BPO [0.1] | Antimony chloride [2.5] |
| 16 | | Phosmer-M-Li (*21) [5.0] | | GE-8020 [5.0] | do | BPO [0.1] | Indium chloride [3.0] |

See note at end of Table 6b.

TABLE 2b

| | Curing condition | | Measuring condition | | Electroconductivity (*2) | | | | | |
|---|---|---|---|---|---|---|---|---|---|---|
| | Temperature (°C.) | Time (min.) | Moisture (percent) | Temperature (°C.) | Surface specific resistance (ohm) | Volume specific resistance (ohm·cm.) | Water resistance(*3) | Solvent resistance (*4) | Tensile strength (kg.) (*5) | Pencil hardness(*6) |
| Example: | | | | | | | | | | |
| 9 | 120 | 2 | 40 | 20 | $5.5 \times 10^4$ | $6.7 \times 10^4$ | 50 | 10 | 2.2 | B |
| 10 | 100 | 2 | 40 | 20 | $4.9 \times 10^3$ | $2.1 \times 10^3$ | 50 | 10 | 1.1 | HB |
| 11 | 100 | 2 | 40 | 20 | $2.0 \times 10^3$ | $2.0 \times 10^3$ | 50 | 10 | 0.9 | B |
| 12 | 100 | 2 | 40 | 20 | $5.6 \times 10^4$ | $2.1 \times 10^3$ | 50 | 10 | 1.0 | B |
| 13 | 100 | 2 | 40 | 20 | $4.2 \times 10^5$ | $3.7 \times 10^5$ | 50 | 10 | 2.5 | B |
| 14 | 100 | 2 | 40 | 20 | $4.5 \times 10^5$ | $2.9 \times 10^5$ | 50 | 10 | 2.1 | B |
| 15 | 100 | 2 | 40 | 20 | $1.1 \times 10^4$ | $1.9 \times 10^4$ | 20 | 5 | 1.5 | 4B |
| 16 | 100 | 2 | 40 | 20 | $9.2 \times 10^3$ | $8.1 \times 10^3$ | 20 | 5 | 1.5 | 4B |

See notes at end of Table 6b.

TABLE 3a

| | Composition | | | | | | |
|---|---|---|---|---|---|---|---|
| Ex. | Sulfonic ester | Phosphoric ester | Phosphoric diester | Epoxy compound | Solvent | Polymerization initiator or photosensitizer | Other additive |
| 17 | SBA-Cu (*12) [4.5] | | | GE-1090 (*49) [5.5] | Methyl ethyl ketone [20] | BPO [0.1] | Ferric chloride [2.0] |
| 18 | | | Phosmer-MD-Zn (*31)[2.5] | GE-3070 (*50) [7.5] | do | BPO [0.1] | Zinc oxide [1.5] |
| 19 | | Phosmer-Cl-Al (*22) [7.0] | | CelAc-Ep [3.0] | | LPO [0.7] | Titanium phosphate [0.5] |
| 20 | SEA-NH₃ (*13) [4.0] | Phosmer-M-dimethylamine (*23) [2.0] | | CAP-Ep [4.0] | | KW-8 (*58) [0.6] | |
| 21 | | Phosmer-Cl-n-butylamine (*24) [2.5] | Phosmer-ClD-triethanolamine (*32) [2.5] | Epikote 1007 (*39) [5.0] | Acetone [20] | KW-8 [0.6] | |
| 22 | SEM-pyridine (*14) [1.0] | | Phosmer-MD-p-phenylene diamine (*35) [1.5] | Epikote 1009 (*39) [7.5] | do | AIBN [0.7] | |

See notes at end of Table 6b.

TABLE 3b

| | Curing condition | | Test results of electroconductive film | | | | | | | |
|---|---|---|---|---|---|---|---|---|---|---|
| | | | Measuring condition | | Electroconductivity | | | | | |
| | Temperature (° C.) | Time (min.) | Moisture (percent) | Temperature (° C.) | Surface specific resistance (ohm) | Volume specific resistance (ohm·cm.) | Water resistance | Solvent resistance | Tensile strength (kg.) | Pencil hardness |
| Example: | | | | | | | | | | |
| 17 | 100 | 2 | 40 | 20 | $1.2 \times 10^4$ | $3.6 \times 10^4$ | 20 | 5 | 1.5 | 4B |
| 18 | 100 | 2 | 40 | 20 | $2.4 \times 10^5$ | $7.1 \times 10^5$ | 20 | 4 | 2.0 | 3B |
| 19 | 150 | 1 | 40 | 20 | $2.2 \times 10^5$ | $1.5 \times 10^5$ | 15 | 3 | 1.5 | 4B |
| | Light irradiation (*62) | | | | | | | | | |
| 20 | 50 | 10 | 40 | 20 | $3.4 \times 10^5$ | $2.6 \times 10^5$ | 10 | 3 | 1.5 | 6B |
| 21 | 25 | 10 | 40 | 20 | $6.7 \times 10^5$ | $8.2 \times 10^5$ | 12 | 3 | 1.9 | 6B |
| | Temperature (° C.) | Time (min.) | | | | | | | | |
| 22 | 100 | 1 | 40 | 20 | $9.7 \times 10^5$ | $9.1 \times 10^5$ | 50 | 10 | 2.2 | 6B |

See notes at end of table 6b.

TABLE 4a

| Ex. | Sulfonic ester | Phosphoric ester | Phosphoric diester | Epoxy compound | Solvent | Polymerization initiator or photosensitizer | Other additive |
|---|---|---|---|---|---|---|---|
| 23 | SEM-ethylenediamine(*15) [5.0] | | | Epikote 1004 [5.0] | Acetone [20] | AIBN [0.7] | |
| 24 | SEM [5.0] | | | GE-8020 [5.0] | do | do | |
| 25 | SEM [5.0] | | | GE-8020 [4.0] | do | ACCBPE (*59) [0.7] | |
| 26 | | Phosmer-Cl [6.0] | | GE-8020 [4.0] | | AIBN [0.7] | |
| 27 | | do | | GE-8020 [4.0] | | AIBN [0.7] | |
| 28 | | do | | GE-8020 [4.0] | | AIBN [0.7] | |
| 29 | SEM-Cl [7.5] | | | GE-8020 [2.5] | | | |

See notes at end of Table 6b.

TABLE 4b

| | Curing condition | | Test results of electroconductive film | | | | | | | |
|---|---|---|---|---|---|---|---|---|---|---|
| | | | Measuring condition | | Electroconductivity | | | | | |
| | Temperature (° C.) | Time (min.) | Moisture (percent) | Temperature (° C.) | Surface specific resistance (ohm) | Volume specific resistance (ohm·cm.) | Water resistance | Solvent resistance | Tensile strength (kg.) | Pencil hardness |
| Example: | | | | | | | | | | |
| 23 | 100 | 1 | 40 | 20 | $6.9 \times 10^5$ | $9.9 \times 10^5$ | 50 | 10 | 2.0 | 6B |
| 24 | Electron beam irradiation (*63) | | 40 | 20 | $2.2 \times 10^5$ | $2.0 \times 10^5$ | 20 | 4 | 1.5 | 2B |
| 25 | 20 | 30 | 40 | 20 | $2.1 \times 10^5$ | $2.1 \times 10^5$ | 5 | 1 | 1.0 | 6B |
| 26 | 100 | 6 | 80 | 20 | $2.3 \times 10^4$ | $1.5 \times 10^4$ | 50 | 10 | 2.0 | B |
| 27 | 100 | 6 | 40 | 20 | $7.4 \times 10^4$ | $6.5 \times 10^4$ | 50 | 10 | 2.0 | B |
| 28 | 100 | 6 | 15 | 20 | $9.1 \times 10^4$ | $9.6 \times 10^4$ | 50 | 10 | 2.0 | B |
| 29 | 100 | 5 | 40 | 20 | $1.1 \times 10^4$ | $1.5 \times 10^4$ | 20 | 10 | 1.5 | 4B |

TABLE 5a

| Example | Sulfonic ester | Phosphoric ester | Phosphoric diester | Epoxy compound | Solvent | Polymerization initiator or photosensitizer | Other additive |
|---|---|---|---|---|---|---|---|
| 30 | SEA-Al [2.0] | Phosmer-M-pyridine salt (*25) [2.0] | | GMA [6.0] | Methyl ethyl ketone [20] | | |
| 31 | SEM-diethylamine (*17) [3.0] | | Phosmer-MDA (*34) [2.0] | GMA [5.0] | do | | |
| 32 | | Phosmer-MA-p-phenylenediamine salt (*26) [1.0] | Phosmer-MDA-Li (*35) [4.5] | PVA-Ep [4.5] | | | Nickel powder [3.0] |
| 33 | | Phosmer-MD-ethylenediamine [7.5] | EtCel-Ep [2.5] | | | | Copper powder [3.0] |
| 34 | SEM [1.0] | Phosmer-Cl-ethylenediamine [1.0] | Phosmer-ClD-Al (*37) [4.5] | CelAc-Ep [3.5] | | | |
| 35 | | | Phosmer-ClD-morpholine (*38) [5.5] | CelAc-Ep [4.5] | Tetrahydrofuran [20] | | |
| 36 | | Phosmer-Cl-Mg (*28) [7.5] | | CelAc-Ep [2.5] | | | |

See notes at end of Table 6b.

TABLE 5b

| | Curing condition | | Measuring condition | | Electroconductivity | | Water resistance | Solvent resistance | Tensile strength (kg.) | Pencil hardness |
|---|---|---|---|---|---|---|---|---|---|---|
| | Temperature (°C.) | Time (min.) | Moisture (percent) | Temperature (°C.) | Surface specific resistance (ohm) | Volume specific resistance (ohm·cm.) | | | | |
| Example: | | | | | | | | | | |
| 30 | 100 | 5 | 40 | 20 | $5.6 \times 10^4$ | $6.5 \times 10^4$ | 25 | 10 | 2.0 | 3B |
| 31 | 100 | 5 | 40 | 20 | $4.1 \times 10^4$ | $2.5 \times 10^4$ | 50 | 10 | 2.1 | 4B |
| 32 | 100 | 5 | 40 | 20 | $4.5 \times 10^3$ | $1.0 \times 10^3$ | 50 | 10 | 1.4 | B |
| 33 | 100 | 2 | 40 | 20 | $1.4 \times 10^3$ | $4.5 \times 10^3$ | 50 | 10 | 1.4 | B |
| 34 | 100 | 2 | 40 | 20 | $4.1 \times 10^4$ | $9.7 \times 10^4$ | 50 | 10 | 2.5 | 2B |
| 35 | 100 | 2 | 40 | 20 | $6.9 \times 10^4$ | $1.0 \times 10^5$ | 50 | 10 | 2.5 | 2B |
| 36 | 100 | 2 | 40 | 20 | $7.5 \times 10^4$ | $2.0 \times 10^5$ | 50 | 10 | 2.1 | B |

TABLE 6a

| | Composition |
|---|---|
| Comparative example: | |
| 1 | ECR-34 (made by The Dow Chemical Company). |
| 2 | Do. |
| 3 | Do. |
| 4 | A sheet which is mixed with electroconductive carbon (film thickness 100 microns). |

TABLE 6b

| Comparative example | Curing condition | | Measuring condition | | Electroconductivity | | Water resistance | Solvent resistance | Tensile strength (kg.) | Pencil hardness |
|---|---|---|---|---|---|---|---|---|---|---|
| | Temperature (°C.) | Time (hour) | Moisture (percent) | Temperature (°C.) | Surface specific resistance (ohm) | Volume specific resistance (ohm·cm.) | | | | |
| 1 | Room temp. | 3 | 70 | 25 | $2.1 \times 10^7$ | $4.0 \times 10^7$ | 0.5 | 0.5 | 0.1 | Below 6B. |
| 2 | do | 3 | 50 | 25 | $2.2 \times 10^8$ | $4.0 \times 10^8$ | 0.5 | 0.5 | 0.1 | Do. |
| 3 | do | 3 | 15 | 25 | $1.0 \times 10^9$ | $9.8 \times 10^9$ | 0.5 | 0.5 | 0.1 | Do. |
| 4 | do | 3 | 50 | 20 | $4.5 \times 10^6$ | $2.6 \times 10^6$ | 50 | 6 | 0.4 | Do. |

(*1) The numerals in the brackets [ ] in the columns of components for the composition indicates respective amounts as used, by parts by weight.
(*2) The electroconductivity was measured as follows: As the measuring apparatus, Electrode TR-42 for measuring ultra high resistances (made by Takeda Riken, Japan) and an ammeter (made by Yokokawa Electric Works, Limited, Japan) were used. The measurements were carried out in accordance with JIS-K-6723 and "Plastic Testing Handbook" (published by Nikkan Kogyo Shimbun-sha, Japan).
(*3) Each test piece was immersed into water at a temperature of 20° C. and the period to become cloudy of the electroconductive film was measured. Each numeral as indicated is represented by "days."
(*4) Each test piece was immersed into chlorobenzene at a temperature of 20° C. and the period to become cloudy of the electroconductive film was measured. Each numeral as indicated is also represented by "days."
(*5) Each test piece with the size of 10-20 mm. was put to the test with using "'Tensilon" Universal Tensile Testing Machine, Model UTM-II (made by Toyo Sokki Kabushiki Kaisha, Japan) at a temperature of 20° C. and a tensile rate of 20 mm./min.
(*6) Pencil hardness was measured in accordance with JIS-K-5652.5.15 at a temperature of 20° C.
(*7) SEM represents 2-sulfoethylene methacrylate.
(*8) SEA represents 2-sulfoethylene acrylate.
(*9) SBA represents 2-sulfotetramethylene acrylate.
(*10) SEM-Cl represents 2-sulfo-2-chloroethylene methacrylate.
(*11) SEM-NA represents sulfonic ester which is obtained from 1 mole of SEM and 1 mole of NaOH.
(*12) SBA-Cu represents sulfonic ester which is obtained from 2 moles of SBA and 1 mole of Cu(OH)$_2$.
(*13) SEA-NH$_3$ represents sulfonic ester which is obtained from 1 mole of SEA and 1 mole of ammonia.
(*14) SEM-pyridine represents sulfonic ester which is obtained from 1 mole of SEM and 1 mole of pyridine.
(*15) SEM-ethylenediamine represents sulfonic ester which is obtained from 2 moles of SEM and 1 mole of ethylenediamine
(*16) SEA-Al represents sulfonic ester which is obtained from 3 moles of SEA and 1 mole of Al(OH)$_3$.
(*17) SEM-diethylamine represents sulfonic ester which is obtained from 1 mole of SEM and 1 mole of diethylamine.
(*18) Phosmer-M represents phosphoric ethylene methacrylate.
(*19) Phosmer-MA represents phosphoric ethylene acrylate.
(*20) Phosmer-Cl represents 2-phosphoric-2-chloroethylene methacrylate.
(*21) Phosmer-M-Li represents phosphoric ester which is obtained from 1 mole of phosmer-M and 2 moles of LiOH.
(*22) Phosmer-Cl-Al represents phosphoric ester which is obtained from 3 moles of Phosmer-Cl and 2 moles of Al(OH)$_3$.
(*23) Phosmer-M-dimethylamine represents phosphoric ester which is obtained from 1 mole of Phosmer-M and 2 moles of dimethylamine.
(*24) Phosmer-Cl-n-butylamine represents phosphoric ester which is obtained from 1 mole of Phosmer-Cl and 2 moles of n-butylamine.
(*25) Phosmer-M-pyridine salt represents phosphoric ester which is obtained from 1 mole of Phosmer-M and 2 moles of pyridine.
(*26) Phosmer-MA-p-phenylenediamine salt represents phosphoric ester which is obtained from 1 mole of Phosmer-MA and 1 mole pf p-phenylenediamine.
(*27) Phosmer-Cl-ethylenediamine represents phosphoric ester which is obtained from 1 mole of Phosmer-Cl and 1 mole of ethylenediamine.
(*28) Phosmer-Cl-Mg represents phosphoric ester which is obtained from 1 mole of Phosmer-Cl and 1 mole of Mg(OH)$_2$.
(*29) Phosmer-MD represents phosphoric bis (ethylene methacrylate).
(*30) Phosmer-ClD represents the compound as defined by the following formula:

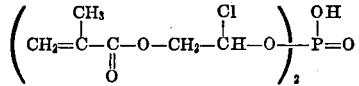

(*31) Phosmer-MD-Zn represents phosphoric diester which is obtained from 2 moles of Phosmer-MD and 1 mole of Zn(OH)$_2$.
(*32) Phosmer-ClD-triethanolamine represents phosphoric diester which is obtained from 1 mole of Phosmer-ClD and 1 mole of triethanolamine.
(*33) Phosmer-MD-p-phenylenediamine represents phosphoric diester which is obtained from 2 moles of Phosmer-MD and 1 mole of p-phenylenediamine.
(*34) Phosmer-MDA represents the compound as defined by the following formula:

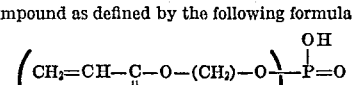

FOOTNOTES—Continued (*35) Phosmer-MDA-Li represents phosphoric diester which is obtained from 1 mole of Phosmer-MDA and 1 mole of LiOH.
(*36) Phosmer-MD-ethylenediamine represents phosphoric diester which is obtained from 2 moles of Phosmer-MD and 1 mole of ethylenediamine.
(*37) Phosmer-ClD-Al represents phosphoric diester which is obtained from 3 moles of Phosmer-ClD and 1 mole of Al(OH)$_3$.
(*38) Phosmer-ClD-morpholine represents phosphoric diester which is obtained from 1 mole of Phosmer-ClD and 1 mole of morpholine.
(*39) Epikote 1004, Epikote 1007, and Epikote 1009 are the trade names of the epoxy resins which are made by Shell Chemical Co., Ltd. These epoxy resins are polyglycidyl ethers of bisphenol A.
(*40) GE-2080 represents a copolymer of glycidyl methacrylate/ethyl methacrylate=20/80 (weight ratio), and the copolymer has a number average molecular weight of about 15,000 and epoxy equivalent of 602 g./mole of epoxy group.
(*41) GE-5050 represents a copolymer of glycidyl methacrylate/ethyl methacrylate=50/50 (weight ratio), and the copolymer has a number average molecular weight of about 5,800 and epoxy equivalent of 250 g./mole of epoxy group.
(*42) PVA-Ep represents the reaction product of 100 parts by weight of polyvinyl alcohol and 25 parts by weight of epichlorohydrin. The product has a number average molecular weight of about 100,000 and epoxy equivalent of 452 g./mole of epoxy group.
(*43) EtCel-EP represents the reaction product of 100 parts by weight of ethyl cellulose and 22 parts by weight of epichlorohydrin. The product has a number average molecular weight of about 25,000 and epoxy equivalent of 465 g./mole of epoxy group.
(*44) GE-8020 represents a copolymer of glycidyl methacrylate/ethyl methacrylate=80/20 (weight ratio), and the copolymer has a number average molecular weight of about 3,500 and epoxy equivalent of 175 g./mole of epoxy group.
(*45) GMA-H represents a polymer of glycidyl methacrylate, and the polymer has a number average molecular weight of about 2,000 and epoxy equivalent of 145 g./mole of epoxy group.
(*46) GB-1090 represents a copolymer of glycidyl methacrylate/butyl methacrylate=10/90 (weight ratio), and the copolymer has a number average molecular weight of about 10,000 and epoxy equivalent of 1,420 g./mole of epoxy group.
(*47) CAP-Ep represents the reaction product of 100 parts by weight of cellulose acetate phthalate and 5 parts by weight of epichlorohydrin. The product has a number average molecular weight of about 30,000 and epoxy equivalent of 1,850 g./mole of epoxy group.
(*48) CelAc-Ep represents the reaction product of 100 parts by weight of cellulose acetate and 35 parts by weight of epichlorohydrin. The product has a number average molecular weight of about 15,000 and epoxy equivalent of 380 g./mole of epoxy group.
(*49) GE-1090 represents a copolymer of glycidyl methacrylate/ethyl methacrylate=10/90 (weight ratio), and the copolymer has a number average molecular weight of about 40,000 and epoxy equivalent of 1,170 g./mole of epoxy group.
(*50) GE-3070 represents a copolymer of glycidyl methacrylate/ethyl methacrylate=30/70 (weight ratio), and the copolymer has a number average molecular weight of about 10,000 and epoxy equivalent of 410 g./mole of epoxy group.
(*51) AIBN represents azobisisobutyronitrile.
(*52) BPO represents benzoyl peroxide.
(*53) DBPO represents di-t-butyl peroxide.
(*54) LPO represents lauroyl peroxide.
(**55) ABVN represents azobisdimethyl valeronitrile.
(*56) BPP represents t-butyl peroxyprivalate.
(*57) ACSP represents acetylcyclohexyl-sulfonyl peroxide.
(*58) KW-8 represents benzoin ethyl ether.
(*59) ACCBPE represents 1,1'-azo-1-chloro-1'-cyanobis(1-phenylethane).
(*60) Neogen R is a trade name of anion surface active agent which is made by Dai-ichi Kogyo Seiyaku Co., Ltd., Japan.
(*61) Teepol B81 is a trade name of anion surface active agent which is made by Dai-ichi Kogyo Seiyaku Co., Ltd., Japan.
(*62) The conditions of the light irradiation were as follows—
 Light source: High pressure mercury lamp H-400P (400 watt) made by Tokyo Shibaura Electric Co., Ltd., Japan.
 Distance between the light source and the surface to be irradiated: 50 cm.
 Curing conditions: As indicated in the table.
(*63) The conditions of the electron beam irradiation were as follows—
 Electron beam: Density of about 50 μa./cm.$_2$ which is accelerated by the acceleration voltage of 250 kv.
 Dose of beam: 1 Mrad.

What is claimed is:

1. A composition for preparing electroconductive resin which comprises:
   (a) one or more members selected from the group consisting of:
      (I) compounds represented by the following general formula:

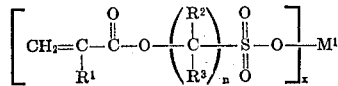

in which R$^1$ is a hydrogen atom or a methyl group; each of R$^2$ and R$^3$ is a hydrogen or halogen atom; $n$ is an integer from 1 to 5; $x$ is an integer from 1 to 3; and M$^1$ is a hydrogen atom, Na, Li, K, Ag, Cu, Mg, Ca, Zn, Ba, Al, ammonium or amine, (II) compounds represented by the following general formula:

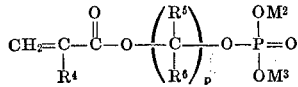

in which R$^4$ is a hydrogen atom or a methyl group; each of R$^5$ and R$^6$ is a hydrogen or halogen atom; $p$ is an integer from 1 to 4; and each of M$^2$ and M$^3$ is a hydrogen atom, Na, Li, K, Ag, ammonium or amine, and (III) compounds represented by the following general formula:

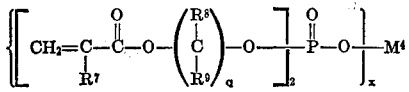

in which R$^7$ is a hydrogen atom or a methyl group; each of R$^8$ and R$^9$ is a hydrogen or halogen atom; $q$ is an integer from 1 to 4; $x$ is an integer from 1 to 3; and M$^4$ is a hydrogen atom, Na, Li, K, Ag, Cu, Mg, Ca, Zn, Ba, Al, ammonium or amine, and (B) compounds which contain vicinal epoxy groups in the molecules.

2. An electroconductive composition as claimed in claim 1, in which said composition is further added with solvents, polymerization initiators and/or photosensitizers.

3. An electroconductive composition as claimed in claim 1, in which the amount of the compounds as defined in paragraph (A) of claim 1 is in the range of 25 to 85 parts by weight and the amount of the compounds as defined in paragraph (B) of claim 1 is in the range of 75 to 15 parts by weight.

4. An electroconductive composition as claimed in claim 1, in which the glass transition temperatures of the compounds as defined in paragraph (B) of claim 1 are higher than 310° K.

5. An electroconductive film which is prepared by applying light rays, heat, actinic rays or ionizing radiation to the resin formed of the composition as claimed in claim 1.

6. The electroconductive composition of claim 1, in which said compounds containing epoxy groups in the molecules are at least one selected from the group consisting of glycidyl acrylate homopolymer, glycidyl methacrylate homopolymer and copolymers of glycidyl acrylate and/or glycidyl methacrylate with at least one of vinyl monomers consisting of ethyl acrylate, methyl methacrylate, styrene, vinyl chloride and vinyl acetate.

7. The electroconductive composition of claim 1, wherein said epoxy compounds of paragraph (B) are polymers comprising esters of glycidol and acrylic acid or methacrylic acid, said epoxy compounds having epoxy equivalent of 100 g. to 2000 g./mol.

8. The electroconductive composition of claim 1 wherein said epoxy compounds of paragraph (B) are copolymers of esters of glycidol and acrylic acid or methacrylic acid and a vinyl monomer, said esters comprising more than 20% by weight of said copolymer.

9. The electroconductive composition of claim 6 wherein the epoxy compounds of paragraph (B) comprise from 15% to 75% of the weight of said electroconductive composition.

10. The electroconductive composition of claim 6 prepared as a film by cross-linking using heat.

11. The electroconductive composition of claim 1 wherein said compounds which contain vicinal epoxy groups in the molecules are a reaction product of epichlorohydrin and bisphenol A.

12. The electroconductive composition of claim 1 wherein said compounds which contain vicinal epoxy groups in the molecules are a reaction product of ethyl cellulose, cellulose acetate, or cellulose acetate phthalate with epichlorohydrin.

13. The electroconductive composition of claim 1 wherein said compounds which contain vicinal epoxy groups in the molecules are a reaction product between polyvinyl alcohol and epichlorohydrin.

References Cited

UNITED STATES PATENTS

| 3,033,833 | 5/1962 | LeFevre et al. | 260—79.3 |
| 3,094,504 | 6/1963 | Murdock et al. | 260—29.6 X |
| 3,297,734 | 1/1967 | Armen et al. | 260—429.9 |
| 3,507,817 | 4/1970 | Molotsky et al. | 260—9 |
| 3,524,901 | 8/1970 | Najvar | 260—835 |

OTHER REFERENCES

Lee & Neville: "Hand book of Epoxy Resins," pp. 1–1 and 1–2, McGraw-Hill, 1967.

WILLIAM H. SHORT, Primary Examiner

E. A. NEILSEN, Assistant Examiner

U.S. Cl. X.R.

117—161 ZB; 204—159.22; 260—23 EP, 47 EP, 79.3 M, 86.1 N, 86.1 R, 89.5 R, 91.3 VA

UNITED STATES PATENT OFFICE
CERTIFICATE OF CORRECTION

Patent No. 3,847,846      Dated November 12, 1974

Inventor(s) Kiyohiko ASADA

It is certified that error appears in the above-identified patent and that said Letters Patent are hereby corrected as shown below:

Column 2, line 3, "Al ammonium" should be --Al, ammonium--.

Column 2, line 19, "M" in the formula should be --$M^4$--.

Column 4, lines 29 and 30, "1,1-azo-1-chloro-1-cyanobis" should be --1,1'-azo-1-chloro-1'-cyanobis--.

TABLE 1a, Ex. 6, "Phosmer-M (*18) (2.5) [2.5]." should be --Phosmer-M (*18) [2.5] --

TABLE 1a, after Ex. 7, "--" should be -- 8-- --.

TABLE 2a, Ex. 12, "Epikote 1004 (3.0)" should be --Epikote 1004 [3.0]--.

TABLE 4a, Ex. 24, "SEM ]5.0]" should be --SEM [5.0]--.

TABLE 4a, Ex. 25, "SEM ]5.0]" should be --SEM [5.0]--.

TABLE 4a, Ex. 29, "SEM-Cl ]7.5" should be --SEM-Cl [7.5]--.

Column 11, footnote (*26), line 2, "pf" should be --of--.

Column 13, footnote (*43), "EtCel-EP" should be --EtCel-Ep--.

Column 13, footnote (*56), "peroxyprivalate" should be --peroxypivalate--.

Column 13, footnote (*63), line 2, "50 $\mu$a./cm.$_2$" should be --50 $\mu A/cm^2$--.

Column 13, line 38, "(a)" should be --(A)--.

Signed and sealed this 1st day of April 1975.

(SEAL)
Attest:

RUTH C. MASON
Attesting Officer

C. MARSHALL DANN
Commissioner of Patents
and Trademarks